US012718519B2

(12) United States Patent
Vishnukumar Sharmini et al.

(10) Patent No.: US 12,718,519 B2
(45) Date of Patent: Aug. 25, 2026

(54) OPEN VOCABULARY IMAGE SEGMENTATION

(71) Applicant: QUALCOMM Incorporated, San Diego, CA (US)

(72) Inventors: Vibashan Vishnukumar Sharmini, San Diego, CA (US); Shubhankar Mangesh Borse, San Diego, CA (US); Hyojin Park, San Diego, CA (US); Debasmit Das, San Diego, CA (US); Munawar Hayat, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/502,719

(22) Filed: Nov. 6, 2023

(65) Prior Publication Data

US 2025/0148752 A1 May 8, 2025

(51) Int. Cl.
*G06V 10/75* (2022.01)
*G06V 30/148* (2022.01)

(52) U.S. Cl.
CPC .......... *G06V 10/751* (2022.01); *G06V 30/148* (2022.01)

(58) Field of Classification Search
CPC .... G06V 10/751; G06V 30/148; G06V 10/26; G06V 10/82
See application file for complete search history.

(56) References Cited

U.S. PATENT DOCUMENTS

2023/0281999 A1* 9/2023 Schulter .................. G06V 20/70 382/159
2024/0153093 A1* 5/2024 Xu .......................... G06V 20/70
2024/0169545 A1* 5/2024 Lan ...................... G06N 3/0455

OTHER PUBLICATIONS

Kirillov, Alexander, et al. "Segment Anything." arXiv preprint arXiv:2304.02643 (2023).https://arxiv.org/abs/2304.02643 (Year: 2023).*
Ding, Jian, et al. "Decoupling Zero-Shot Semantic Segmentation." arXiv preprint arXiv:2112.07910 (2021).https://arxiv.org/abs/2112.07910 (Year: 2021).*
Ding J., et al., "Decoupling Zero-Shot Semantic Segmentation", 2022 IEEE/CVF Conference on Computer Vision and Pattern Recognition (CVPR), IEEE, Jun. 18, 2022, pp. 11573-11582, XP034193607, p. 11576, col. 2, line 9-line 10 p. 11577, col. 2, line 35-line 36, figures 1(c), 2, 5-6 caption of figure 2.
International Search Report and Written Opinion—PCT/US2024/044909—ISA/EPO—Dec. 12, 2024.

(Continued)

*Primary Examiner* — Han Hoang
(74) *Attorney, Agent, or Firm* — Patterson & Sheridan LLP

(57) ABSTRACT

Certain aspects of the present disclosure provide techniques and apparatus for improved machine learning. In an example method, an input image is accessed, and the input image is processed using an image encoder to generate an image embedding tensor. The image embedding tensor is processed using a mask decoder machine learning model to generate a set of mask embedding tensors. A textual input is processed using a text encoder to generate a text embedding tensor. A set of augmented masks is generated based on aggregating the text embedding tensor with the set of mask embedding tensors.

30 Claims, 7 Drawing Sheets

(56) References Cited

OTHER PUBLICATIONS

Vs V., et al., "PosSAM: Panoptic Open-Vocabulary Segment Anything", CORR, [Online], arXiv:2403.09620v1, vol. abs/2403.09620, [cs.CV], Mar. 14, 2024, pp. 1-25, XP093229362, the whole document.
Chen J., et al., "Semantic Segment Anything (SSA)", Zhang Vision Group, Retrieved on Feb. 1, 2024, pp. 1-16.
Kirillov A., et al., "Segment Anything", arXiv:2304.02643v1 [cs.CV], Apr. 5, 2023, pp. 1-30.

* cited by examiner

OPEN VOCABULARY IMAGE SEGMENTATION

INTRODUCTION

Aspects of the present disclosure relate to machine learning.

A wide variety of machine learning models have been trained for a similarly vast assortment of tasks in recent years. For example, in the field of computer vision, machine learning models have been trained to perform depth estimation, object detection and recognition, image segmentation, and the like. Generally image segmentation corresponds to the process of partitioning an input image into segments, such as based on visual boundaries between depicted objects. For example, a model may be trained to generate masks for an input image, where each mask indicates the set of pixels (from the input image) that depict a corresponding object.

Some models can be prompted (e.g., by indicating a point or bounding box in the input image), causing the model to generate a mask that corresponds to the point or box. By training such models on vast amounts of training data, highly accurate masks (e.g., having smooth boundaries and representing an accurate segmentation) can be generated.

BRIEF SUMMARY

Certain aspects of the present disclosure provide a processor-implemented method, comprising: accessing an input image; processing the input image using an image encoder to generate an image embedding tensor; processing the image embedding tensor using a mask decoder machine learning model to generate a set of mask embedding tensors; processing a textual input using a text encoder to generate a text embedding tensor; and generating a set of augmented masks based on aggregating the text embedding tensor with the set of mask embedding tensors.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure provide apparatuses, methods, processing systems, and non-transitory computer-readable mediums for providing improved machine learning.

Some conventional segmentation approaches lack class awareness. That is, the generated masks generally do not have class information (e.g., indicating which class the object corresponding to the mask belongs to). Similarly, some conventional segmentation approaches lack object or instance awareness. For example, the models often generate multiple masks for a single object or instance (e.g., multiple masks for a single person, where each mask indicates a corresponding portion or segment of the depicted person).

In some aspects of the present disclosure, a pre-trained segmentation model can be leveraged, along with a newly trained decoder, to perform panoptic segmentation using open-vocabulary prompts. In some aspects, the pre-trained segmentation model may generally comprise an image encoder, a prompt encoder, and a decoder. In some aspects, the image encoder can be used to generate image embeddings representing the features of input images. These embeddings can then be processed using a newly trained decoder, where the new decoder has been trained to generate mask embeddings based on learned class and instance awareness, as discussed in more detail below. By combining pre-trained encoders that are able to generate highly accurate masks, as well as newly trained decoders that are semantic-aware, aspects of the present disclosure provide substantially improved panoptic segmentation.

In some aspects, open-vocabulary segmentation (e.g., segmenting and classifying any objects, as compared to a closed vocabulary where the model can only classify objects that fit within the defined classes used during training) can further be provided by training the decoder to align its generated mask embeddings with a class embedding space (e.g., with text embeddings from a vocabulary). In some aspects, augmented masks are generated by classifying mask embeddings based on text embeddings corresponding to open vocabulary user input, and aggregating or associating the generated masks with the classifications. In this way, the masks have associated classifications (also referred to in some aspects as predictions) indicating what object(s) are depicted by each mask. This may be referred to as panoptic segmentation, in some aspects, as the masks are a segmentation (e.g., a set of pixels) and have semantic meaning.

In some aspects, class-aware points can then be sampled from the augmented masks, and these sampled points can be used to prompt the decoder of the pre-trained segmentation model in order to further refine the segmentation masks. For example, for any masks that are classified as depicting an object corresponding to the user input (e.g., a cat), the mask(s) can be processed using a post-processing pipeline to refine the mask(s) and generate more accurate output.

Figure 1:
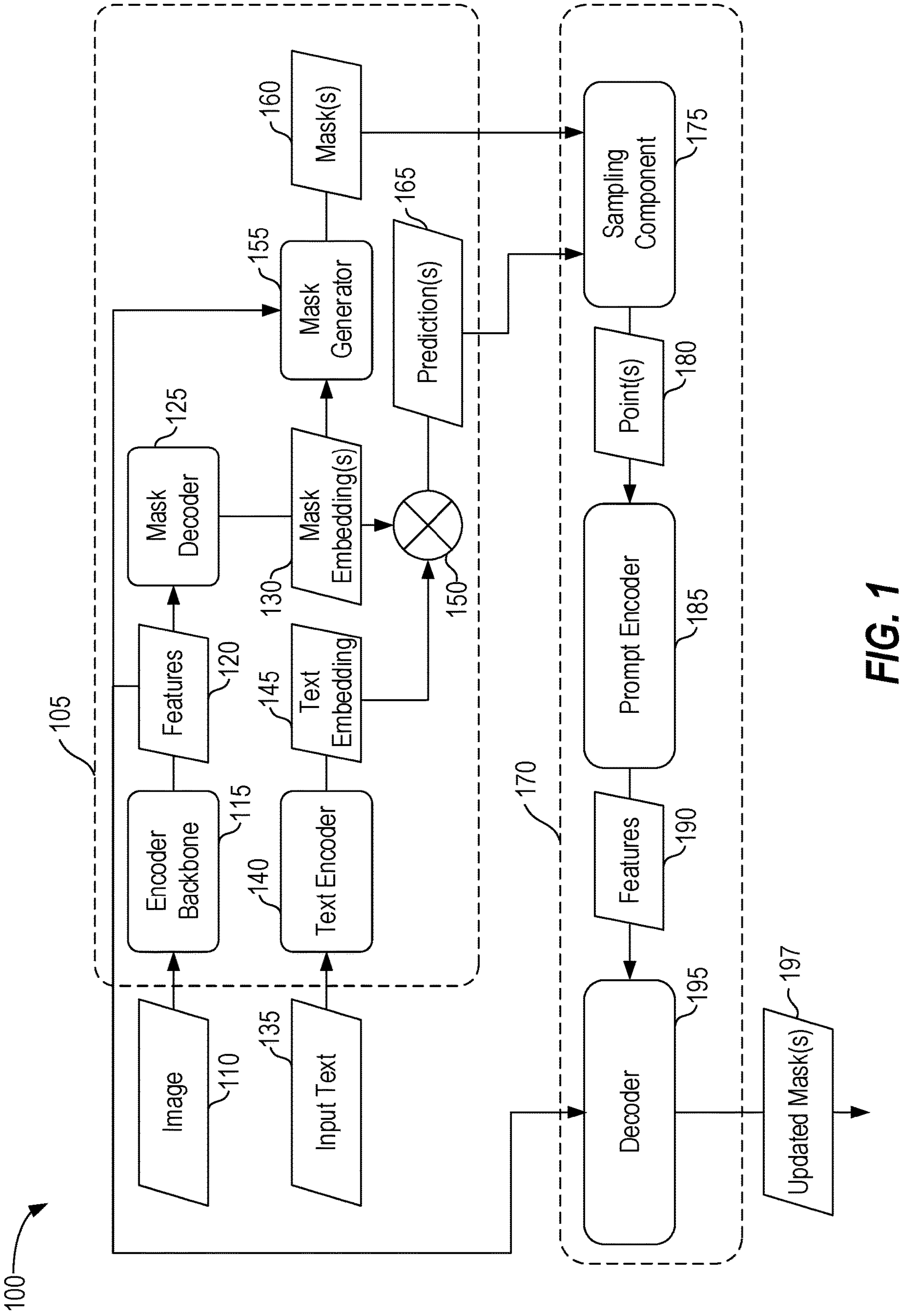
FIG. 1 depicts an example workflow for performing panoptic segmentation using machine learning models, according to some aspects of the present disclosure.

Example Workflow for Performing Panoptic Segmentation Using Machine Learning Models FIG. 1 depicts an example workflow 100 for performing panoptic segmentation using machine learning models, according to some aspects of the present disclosure. In some aspects, the workflow 100 is performed by a machine learning system (e.g., a processing system that uses trained machine learning models to generate augmented masks based on input images and text). That is, each of the depicted components may be a component of a processing system. Generally, each component may be implemented using hardware, software, or a combination of hardware and software.

The illustrated workflow 100 comprises an augmented mask generation pipeline 105 (which uses machine learning to generate masks 160 and predictions 165, as discussed in more detail below) and a post-processing pipeline 170 (which refines or updates the masks 160 to generate updated masks 197, as discussed in more detail below). In the illustrated workflow 100, the augmented mask generation pipeline 105 accesses an input image 110 and input text 135. Generally, the input image 110 and input text 135 may be provided by any entity, such as a user, another application or system, and the like. As used herein, "accessing" data generally includes receiving, requesting, retrieving, collecting, generating, obtaining, or otherwise gaining access to the data.

The image 110 generally corresponds to or comprises a digital image which may depict one or more objects. The input text 135 generally corresponds to or comprises natural language text indicating which object(s) should be segmented and/or identified in the image 110. For example, the input text 135 may specify objects such as "cats" or "televisions," indicating or requesting to identify and segment out (e.g., generate a mask of) the indicated object(s). In some aspects, rather than textual input, the machine learning system may receive other natural language input (e.g., audio), which may be processed (e.g., using one or more speech-to-text algorithms) to generate textual input.

In the illustrated example, the image 110 is processed by an encoder backbone 115 to generate a set of features 120 (also referred to in some aspects as an image embedding and/or an image embedding tensor). In some aspects, the encoder backbone 115 is a pre-trained encoder of a segmentation machine learning model (e.g., a Segment Anything Model (SAM)). That is, the encoder backbone 115 may comprise a set of parameters having values learned during training. The encoder backbone 115 may generally perform a variety of operations (e.g., convolution operations, vision transformer operations, and the like) to generate the features 120 based on the input image 110. In some aspects, the encoder backbone 115 may be referred to as a non-semantic image encoder.

In some aspects, the pre-trained segmentation model may generally comprise an encoder (e.g., the encoder backbone 115), a prompt encoder (e.g., the prompt encoder 185), and a decoder (e.g., the decoder 195). The pre-trained segmentation model may generally be able to generate accurate masks (e.g., masks that closely align with the depicted objects), but which lack corresponding context and semantic awareness. In the illustrated workflow, a mask decoder 125 can be trained and used to provide this awareness.

As illustrated, the features 120 are accessed by the mask decoder 125, which processes the features 120 to generate a set of mask embeddings 130 (also referred to as a set of mask embedding tensors in some aspects). In some aspects, as discussed below in more detail, the mask decoder 125 can be trained in a semantic-aware fashion such that the resulting mask embeddings 130 can be evaluated to predict the class of the corresponding object(s). In some aspects, the mask decoder 125 is a machine learning component having one or more parameters with values learned during training. The mask decoder 125 may generally perform a variety of operations (e.g., convolution operations, vision transformer operations, and the like) to generate the mask embeddings 130 based on the features 120. In some aspects, the number of mask embeddings 130 generated by the mask decoder 125 may be a hyperparameter and/or may be specified as an input to the mask decoder 125 (e.g., instructing the mask decoder 125 to generate N masks). In some aspects, the mask decoder 125 may be referred to as a semantic mask decoder.

The mask embeddings 130 are accessed by a mask generator 155, which also accesses the features 120, to generate a set of masks 160. In some aspects, the mask generator 155 is a trained component (e.g., a machine learning component that uses one or more parameters having learned values). In some aspects, the mask generator 155 performs one or more non-parameterized operations. For example, in some aspects, the mask generator 155 may multiply the features 120 with the mask embeddings 130 to generate the masks 160. Each mask 160 generally comprises or indicates a set of pixels in the input image 110, where the set of pixels are all associated with a depicted object. For example, if the image 110 depicts two cats and a dog sitting on a couch, the masks 160 may include a first mask indicating which pixel(s) correspond to or depict the first cat, a second mask indicating which pixel(s) correspond to or depict the second cat, a third mask indicating which pixel(s) correspond to or depict the dog, and a fourth mask indicating which pixel(s) correspond to or depict the couch. In some aspects, each indicated pixel of a given mask 160 corresponds to a single object, but the mask 160 does not actually identify the object. That is, the masks 160 may be class-agnostic (e.g., the mask 160 may not indicate that the object is a "cat"). In this way, the mask 160 may be similar to the output of the pre-trained segmentation model.

In the depicted workflow 100, the input text 135 is accessed by a text encoder 140 to generate a text embedding 145 (also referred to as an input text embedding tensor in some aspects). In some aspects, the text encoder 140 is a pre-trained machine learning component that generates embeddings based on textual inputs. For example, the text encoder 140 may be the text encoder portion of a Contrastive Language-Image Pre-Training (CLIP) model. The text encoder 140 may generally have been trained alongside an image encoder, where the text and image encoders learn to generate embeddings that align when the text and image match. For example, an image of a cat may be processed to generate an image embedding, and the text "cat" may be processed to generate a text embedding. The differences between these embeddings may then be used to refine both encoders, resulting in a text encoder and an image encoder that generate embeddings that align in the latent space when the text and image are semantically aligned.

In the illustrated example, the text embedding 145 and mask embeddings 130 are accessed by an aggregation operation 150. The aggregation operation 150 may generally combine the text embedding 145 with the mask embeddings 130 using one or more operations to generate a set of predictions 165. For example, in some aspects, the aggregation operation 150 comprises computing a dot product between the text embedding 145 and each of the mask embeddings 130. In some aspects, the dot product is used as a measure of how closely the text embedding 145 aligns with each of the mask embeddings 130.

The predictions 165 (also referred to in some aspects as classifications or logits) may therefore indicate whether each mask embedding 130 corresponds to or depicts the object(s) indicated in the input text 135. That is, each of the predictions 165 may indicate the probability that a region of the input image 110 which corresponds to a mask 160 associated with the prediction 165 (e.g., generated based on the same mask embedding 130) depicts an entity or object that corresponds to the input text. For example, the aggregation operation 150 may generate a prediction 165 for each mask embedding 130, where the prediction 165 is a value (e.g., between zero and one). In some aspects, the value of the prediction 165 indicates the probability or likelihood that the mask embedding 130 corresponds to the input text 135. For example, if the input text 135 includes "cat" and the prediction 165 for a given mask embedding 130 is 0.8, there is a good chance that the mask embedding 130 corresponds to a cat depicted in the image 110 (e.g., the mask 160 generated based on the given mask embedding 130 corresponds to a region of the input image 110 that depicts a cat). If the prediction 165 is lower (e.g., 0.05), there is a low chance that the mask embedding 130 corresponds to a cat.

Although not depicted in the illustrated example, in some aspects, the predictions 165 and masks 160 may be aggregated, combined, or otherwise associated to generate augmented masks. For example, for a given mask embedding 130, the corresponding prediction 165 and mask 160 may be linked or associated to generate an augmented mask. In this way, each augmented mask comprises a mask 160 (indicating a set of pixels) and a prediction 165 (indicating the classification of what the pixels depict, such as whether the pixels correspond to or depict the object(s) indicated in the input text 135).

In some aspects, these augmented masks (e.g., the masks 160 and predictions 165) may be provided or returned as output from the augmented mask generation pipeline 105. For example, some or all of the masks 160 and/or corresponding predictions 165 may be returned to the entity that provided the input image 110 and/or the input text 135. In some aspects, all of the masks 160 may be provided. In some aspects, the machine learning system may evaluate the predictions 165 to identify which mask(s) 160, if any, correspond to the input text 135. For example, the machine learning system may identify any mask(s) 160 having a prediction 165 above a threshold (e.g., greater than 0.75), and/or may identify the highest-scored mask 160 (e.g., the mask 160 with the highest prediction 165). This subset of mask(s) may then be returned or provided to the requesting entity (e.g., the user) as responsive to the input query (e.g., responsive to the input text 135).

In some aspects, in addition to or instead of outputting the mask(s) 160 and/or prediction(s) 165 to the requesting entity, some or all of the mask(s) 160 and/or prediction(s) 165 may be accessed by the post-processing pipeline 170. In some aspects, all of the masks 160 are provided to the post-processing pipeline 170. In other aspects, a subset of the masks 160 may be provided. For example, the user (or other requesting entity) may select or indicate a subset of mask(s) 160 for further processing, or the machine learning system may select a subset of the masks 160 (e.g., based on the masks' predictions 165, as discussed above). For example, mask(s) 160 that (likely) correspond to the input text 135 (determined based on the predictions 165) may be candidates for further processing to refine the masks. In the illustrated example, the sampling component 175 may evaluate the predictions 165 to identify or select a subset of masks 160 to process (e.g., only processing masks with sufficiently high predictions).

In the illustrated workflow 100, the sampling component 175 samples one or more points 180 from one or more masks 160. That is, from the pixel(s) included in or indicated by a given mask 160, the sampling component 175 may sample (e.g., randomly select) one or more such pixels. These pixels are then used as points 180 to prompt a pre-trained decoder. Although the illustrated example depicts sampled points 180, in some aspects, the sampling component 175 may additionally or alternatively sample one or more boxes or other polygons for the mask 160 (e.g., generating a box that encloses some or all of the pixels indicated in the mask 160).

In some aspects, as discussed above, the pre-trained decoder may be promptable using point(s) and/or bounding polygons. For example, the pre-trained decoder may generate a mask that corresponds to the input point (e.g., masking the object depicted at the point). Generally, the particular number of points 180 (as well as the particular technique(s) used to sample the points 180) used for a given mask 160 may vary depending on the particular implementation. In some aspects, if only a subset of masks 160 are provided to the post-processing pipeline 170 (e.g., only those which correspond to or depict the input text 135, as determined based on the predictions 165), the sampling may be referred to as semantic-aware and/or class-aware sampling (e.g., because additional processing is performed only for masks 160 that correspond to the desired class or category). This may substantially reduce computational expense of the post-processing pipeline 170, as only a subset of the pixels in the original image may undergo further processing (as compared to re-processing the entire image).

As illustrated, the points 180 (or polygons) are then accessed by a prompt encoder 185, which generates features 190 (also referred to as a prompt embedding in some aspects). In some aspects, as discussed above, the prompt encoder 185 may be a component of the pre-trained segmentation model. That is, the prompt encoder 185 may comprise a set of parameters having values learned during training. The prompt encoder 185 may generally perform a variety of operations (e.g., convolution operations, vision transformer operations, and the like) to generate the features 190 based on the points 180.

The features 190 are then accessed by a decoder 195, which also accesses the features 120 (generated by the encoder backbone 115) to generate a set of one or more updated mask(s) 197. In some aspects, as discussed above, the decoder 195 may be a component of the pre-trained segmentation model. That is, the decoder 195 may comprise a set of parameters having values learned during training. The decoder 195 may generally perform a variety of operations (e.g., convolution operations, vision transformer operations, and the like) to generate the updated masks 197 based on the features 190 and the features 120. In some aspects, the decoder 195 may be referred to as a non-semantic mask decoder (as compared to the mask decoder 125, which has semantic meaning).

In some aspects, the decoder 195 processes each set of features 190 (e.g., for each point 180) separately to generate a corresponding updated mask 197. That is, a single set of features 120 may be processed multiple times (in sequence or in parallel) based on multiple features 190 (e.g., multiple points 180, which may correspond to one or more masks 160), generating a new updated mask 197 for each sampled point 180.

In some aspects, each updated mask 197 is generally similar to the masks 160 in terms of content and structure. For example, each updated mask 197 may comprise or indicate a set of pixels, in the input image 110, that are associated with a depicted object (as indicated by a corresponding point 180). For example, if the point 180 corresponds to a pixel depicting a cat in the image 110, the updated mask 197 may indicate which pixel(s) correspond to or depict the cat. In some aspects, by using sampled points 180, the updated mask 197 may be more accurate (e.g., with smoother boundaries and/or representing a more accurate segmentation), as compared to the original masks 160.

In some aspects, in a similar manner to the masks 160, the updated masks 197 may not actually identify the object. That is, the updated masks 197 may be class-agnostic. In some aspects, each updated mask 197 may be combined or associated with its corresponding prediction 165 (e.g., the prediction 165 that was generated for the mask 160 which was sampled to generate the updated mask 197), allowing the updated masks 197 to similarly be used to form augmented masks having semantic meaning.

In some aspects, the updated mask(s) 197 may be returned to the requesting entity (or other downstream process). In some aspects, the updated masks 197 may be aggregated if multiple updated masks 197 are generated for a single mask 160 (e.g., if multiple points 180 are sampled for a given mask 160). For example, the machine learning system may generate a final mask that corresponds to the average of the updated masks 197, the overlap of the updated masks 197 (e.g., only including pixels that are included in all, or at least a threshold proportion of, the updated masks 197), and the like.

In some aspects, the post-processing pipeline 170 may be repeated any number of times to continually generate updated masks. For example, the updated mask(s) 197 generated during a first post-processing iteration may be provided as input to the sampling component 175 to generate a new set of updated mask(s). This post-processing operation may then be repeated any desired number of times until the final output updated mask(s) 197 are generated and provided (e.g., to the requesting user or other entity, to a downstream application, and the like).

Figure 2:
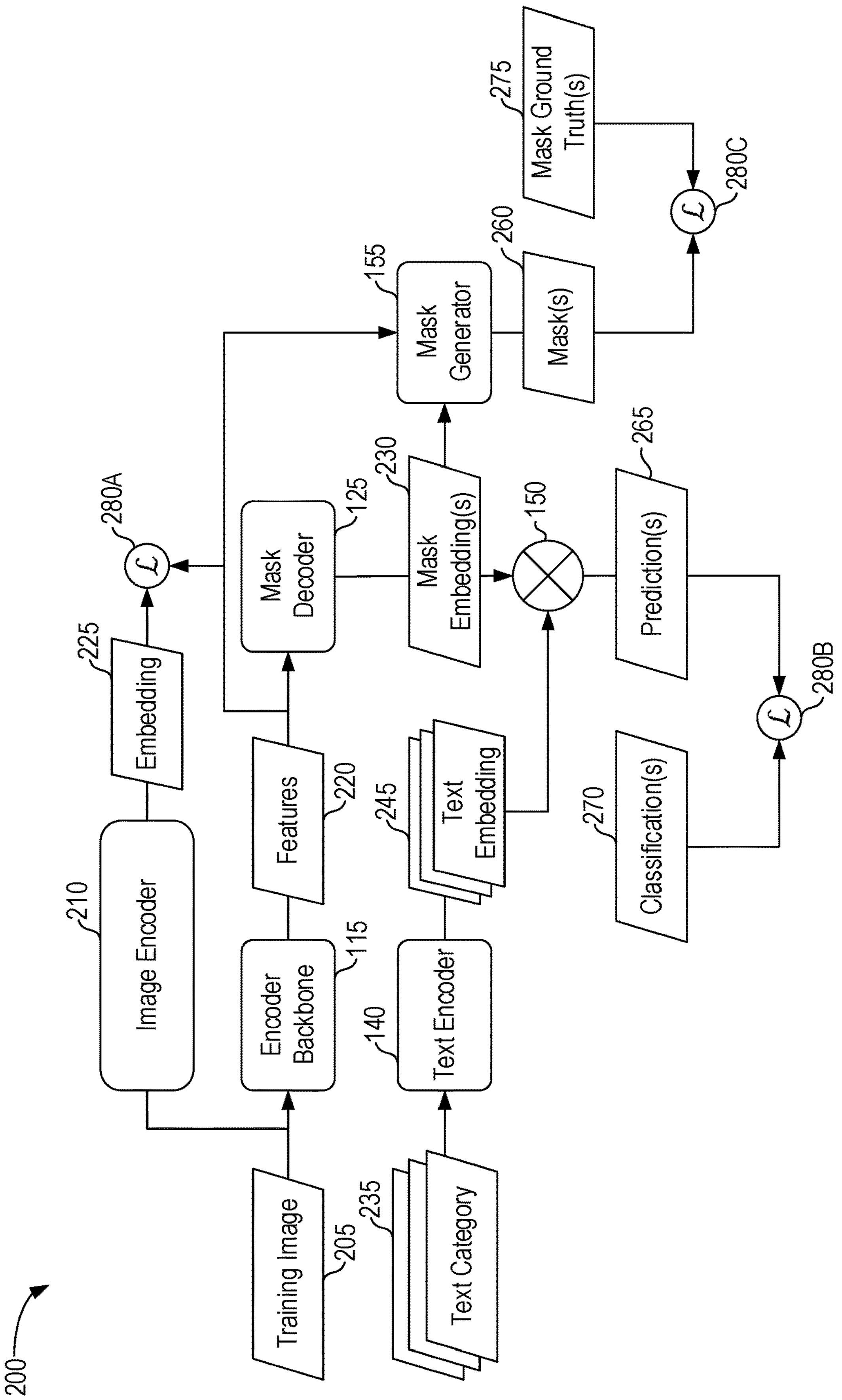
FIG. 2 depicts an example workflow for training machine learning models to perform panoptic segmentation, according to some aspects of the present disclosure.

Example Workflows for Training Machine Learning Models to Perform Panoptic Segmentation FIG. 2 depicts an example workflow 200 for training machine learning models to perform panoptic segmentation, according to some aspects of the present disclosure. In some aspects, the workflow 200 is performed by a machine learning system (e.g., a processing system that trains machine learning models to generate augmented masks based on input images and text). In some aspects, the workflow 200 is performed by the same machine learning system discussed above with reference to FIG. 1. That is, each of the depicted components may be a component of a processing system. Generally, each component may be implemented using hardware, software, or a combination of hardware and software. In some aspects, a single processing system may both train the models, as well as use trained models to generate masks. In other aspects, the training operations and prediction operations may be performed on discrete systems.

In the depicted workflow 200, a training image 205 is accessed by an encoder backbone 115 and an image encoder 210. The training image 205 generally corresponds to or comprises a digital image which may depict one or more objects. The training image 205 may be associated with a set of one or more labels that can be used to train machine learning models. For example, in the illustrated example, the training image 205 has an associated set of mask ground truths 275 (e.g., object segmentations for objects depicted in the image) and a set of classifications 270 (e.g., a semantic meaning for each mask ground truth 275), such as indicating that a given mask ground truth 275 depicts a cat).

In some aspects, as discussed above, the encoder backbone 115 is an image encoder of a pre-trained segmentation model. In some aspects, the image encoder 210 is also a pre-trained model (or model component) that generates embeddings based on image inputs. For example, the image encoder 210 may be the image encoder portion of a CLIP model. The image encoder 210 may generally have been trained alongside a text encoder (e.g., the text encoder 140), where the text and image encoders learn to generate embeddings that align when the text and image match. For example, an image of a cat may be processed to generate an image embedding, and the text "cat" may be processed to generate a text embedding. The differences between these embeddings may then be used to refine both encoders, resulting in a text encoder and an image encoder that generate embeddings that align in the latent space when the text and image are semantically aligned. In some aspects, the image encoder 210 may be referred to as a semantic image encoder (as compared to the encoder backbone 115, which is non-semantic).

In the illustrated example, the encoder backbone 115 generates a set of features 220 (also referred to as an image embedding and/or an image embedding tensor in some aspects, as discussed above). The image encoder 210 also generates an embedding 225 based on the training image 205. As illustrated, the embedding 225 and the features 220 may then be used to compute a first loss component 280A. Generally, the loss component 280A may be generated according to a variety of loss formulations, depending on the particular implementation. In some aspects, the loss component 280A is generated using L1 loss (e.g., the mean absolute error (MAE) between the embedding 225 and the features 220).

In some aspects, the loss component 280A may be used to refine or update one or more parameters of the encoder backbone 115, as discussed in more detail below. In some aspects, the parameters of the encoder backbone 115 may be frozen or unchanged, and the loss component 280A may be used to update one or more auxiliary parameters for the encoder backbone 115. For example, the auxiliary parameters may be used to process the training image 205 in parallel with the encoder backbone 115, and the resulting output may be used to augment the output of the encoder backbone 115 (e.g., the features 220 may be the sum, average, or other aggregation of the output of the encoder backbone 115 and the auxiliary component). As another example, the auxiliary parameters may be used to process the output of the encoder backbone 115 to generate the features 220.

Generally, the auxiliary parameters (if present) may be used to modify or augment the output of the class-agnostic encoder backbone 115 using some class-awareness (e.g., based on the output of the image encoder 210, which has at least some semantic understanding). This may improve the semantic awareness of the features 220 in some aspects, facilitating generation of improved mask embeddings 230.

In the illustrated workflow 200, the features 220 are also accessed by a mask decoder 125, which generates a set of mask embedding(s) 230 (also referred to as a set of mask embedding tensors and/or training mask embedding tensors in some aspects), as discussed above. In some aspects, as discussed above, the mask embeddings 230 are class-agnostic (e.g., the mask embeddings lack class labels). In some aspects, the mask embeddings 230 may include at least some semantic awareness (e.g., if the features 220 are generated based at least in part on auxiliary parameters trained based on the output of the image encoder 210, and/or if the mask decoder 125 has been at least partially trained based on semantic meaning).

In the illustrated workflow 200, a set of text categories 235 are accessed and evaluated by a text encoder 140 to generate a set of text embeddings 245 (also referred to as category text embedding tensors in some aspects). In some aspects, as discussed above, the text encoder 140 may be an encoder component from a pre-trained model, such as a CLIP model. In some aspects, the text categories 235 correspond to a vocabulary of terms or phrases that are used during training of the mask decoder 125. For example, the text categories 235 may comprise a set of words relating to any number and variety of categories, such as "cat," "dog," "horse," and so on. In some aspects, the text categories 235 may correspond to a closed vocabulary (e.g., a finite set of terms). However, as discussed above and below in more detail, by using the text encoder 140, the mask decoder 125 may nevertheless learn to provide open-vocabulary embeddings. For example, suppose one text category 235 includes a class labeled "cat," but does not include a class labeled "tiger."

During inferencing, if the user inputs "tiger" as the input text (e.g., the input text 135 of FIG. 1), the text encoder 140 will generate an embedding that is likely to be similar to the embedding for "cat," as these terms are semantically similar. Accordingly, the machine learning system may learn to segment and semantically identify the mask(s) that depict tiger(s), even though the model was never trained on "tiger" as an input phrase. Stated differently, the text used as input during runtime need not be included in the text categories 235 used during training. The model may nevertheless learn to generate accurate and reliable augmented masks (with accurate semantic meaning), even when prompted with unseen terms.

As illustrated, the text embeddings 245, along with the mask embeddings 230, are accessed by an aggregation operation 150. The aggregation operation 150 may generally combine the text embeddings 245 with the mask embeddings 230 using one or more operations to generate a set of predictions 265. For example, in some aspects, the aggregation operation 150 comprises computing a dot product between each of the text embeddings 245 and each of the mask embeddings 230. In some aspects, as the dot product can be used as a measure of how closely each given text embedding 245 aligns with each given mask embedding 230, the predictions 265 can be used to categorize the mask embeddings 230 based on which text category 235 (or text categories) each mask embedding 230 corresponds to.

In the illustrated workflow 200, these predictions 265 are then used, along with ground truth classifications 270 for the training image 205 (or portions thereof, such as for each segmented object reflected in the mask ground truths 275), to generate a second loss component 280B. For example, the prediction(s) 265 for a given mask embedding 230 (e.g., a respective score for each of the text categories 235) may be compared with the actual classification(s) 270 for the mask embedding 230 (e.g., the actual object(s) depicted by or corresponding to the mask) to generate the loss component 280B.

Generally, the loss component 280B may be generated according to a variety of loss formulations, depending on the particular implementation. In some aspects, the loss component 280B is generated using a cross-entropy (CE) loss between the classifications 270 and the predictions 265. In this way, the loss component 280B can be used to teach the mask decoder 125 to generate mask embeddings 230 which are similar to the text embeddings 245 of the corresponding (correct) classification(s) for the given mask. That is, the mask decoder 125 may learn semantic understanding, such that mask embeddings 230 that correspond to or depict a given object category may be similar to an embedding of that category's term or phrase. In some aspects, the loss component 280B may be used to refine or update one or more parameters of the mask decoder 125, as discussed in more detail below.

In the illustrated workflow 200, the mask embeddings 230 and features 220 are also accessed by a mask generator 155 to generate a set of masks 260. In some aspects, as discussed above, the mask generator 155 may multiply the features 220 with the mask embeddings 230 to generate the masks 260. As discussed above, each mask 260 generally comprises or indicates a set of pixels in the input training image 205, where the set of pixels are all associated with a depicted object.

In the illustrated example, the masks 260 are then used, along with the mask ground truths 275, to generate a third loss component 280C. Generally, the loss component 280C may be generated according to a variety of loss formulations, depending on the particular implementation. In some aspects, the loss component 280C is generated using a binary CE loss between the masks 260 and the mask ground truths 275. In this way, the loss component 280C can be used to teach the mask decoder 125 to generate mask embeddings 230 which are similar to the mask ground truths 275. That is, the mask decoder 125 may learn to generate accurate mask embeddings 230 that indicate which object each pixel depicts. In some aspects, the loss component 280C may be used to refine or update one or more parameters of the mask decoder 125, as discussed in more detail below.

In some aspects, the loss components 280A, 280B, 280C (collectively referred to hereinafter as loss components 280) may be used to refine or update the parameters of the model (e.g., the encoder backbone 115, auxiliary parameters used along with the encoder backbone 115, and/or the mask decoder 125). Generally, the particular operations used to update these parameters may vary depending on the particular implementation. For example, in some aspects, the machine learning system uses Hungarian matching for the overall loss for the mask decoder 125, which is a combination of the loss component 280C and the loss component 280B. The combined loss may then be used to update the parameters of the mask decoder 125 and/or the auxiliary parameters of the encoder backbone 115, such as using backpropagation.

Similarly, the loss component 280A may be used to update the parameters of the encoder backbone 115 (e.g., the auxiliary parameters), such as using backpropagation through the parameters.

Although three loss components 280 are depicted, in some aspects, the machine learning system may use a subset of these components (or may use additional components not depicted). For example, in some aspects, the image encoder 210 may be omitted, and the features 220 may be the direct output of the encoder backbone 115 (e.g., there may be no auxiliary features present, and the parameters of the encoder backbone 115 may be frozen during training).

Advantageously, by using the loss components 280, some or all of the parameters of the model (e.g., of the mask decoder 125) may be updated in a semantic-aware fashion, enabling the combined model (e.g., the encoder backbone 115 and mask decoder 125) to perform panoptic segmentation.

Figure 3:
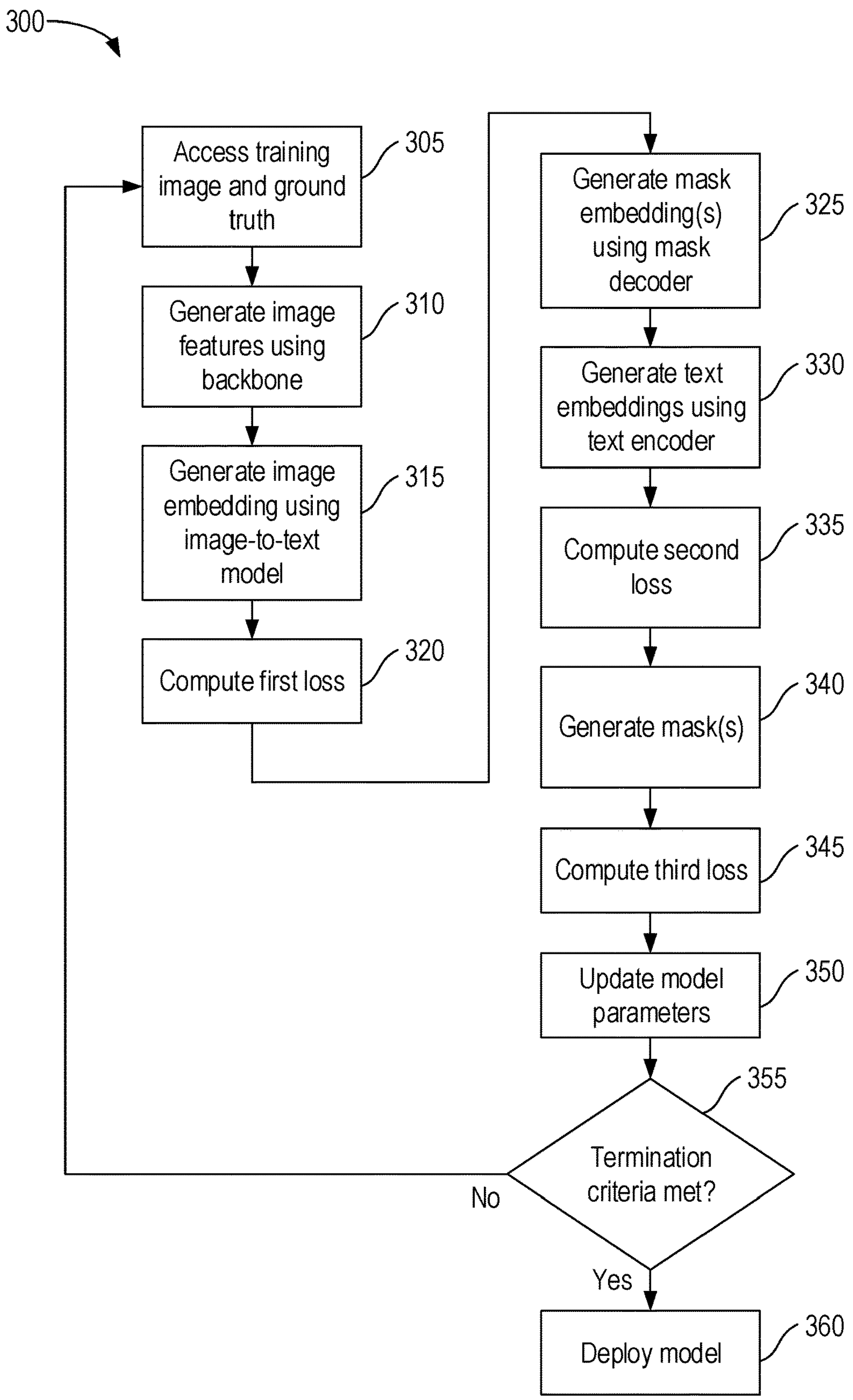
FIG. 3 is a flow diagram depicting an example method for training machine learning models to perform panoptic segmentation, according to some aspects of the present disclosure.

Example Method for Training Machine Learning Models to Perform Panoptic Segmentation FIG. 3 is a flow diagram depicting an example method 300 for training machine learning models to perform panoptic segmentation, according to some aspects of the present disclosure. In some aspects, the method 300 is performed by a machine learning system (e.g., a processing system that trains machine learning models to generate augmented masks based on input images and text). In some aspects, the method 300 is performed by the same machine learning system discussed above with reference to FIGS. 1 and/or 2. That is, a single processing system may both train the models, as well as use trained models to generate masks. In other aspects, the training operations and prediction operations may be performed on discrete systems.

At block 305, the machine learning system accesses a training image (e.g., the training image 205 of FIG. 2) and an associated set of ground truth(s) (e.g., the classification(s) 270 and/or the mask ground truths 275 of FIG. 2). In some aspects, the training image and ground truths (also referred to as labels in some aspects) may collectively be referred to as training data or training exemplars. The training data may generally be accessed from any source, including local and/or remote repositories.

At block 310, the machine learning system generates a set of image features (e.g., the features 120 of FIG. 1 and/or the features 220 of FIG. 2) based on processing the training image using a (potentially pre-trained) backbone component of the model (e.g., the encoder backbone of FIGS. 1 and 2). In some aspects, as discussed above, the backbone comprises a set of parameters (e.g., weights and/or biases) having learned values. For example, in some aspects, the backbone comprises a set of vision transformers. In some aspects, the backbone is class-agnostic (e.g., the backbone lacks semantic awareness).

In some aspects, as discussed above, generating the image features may include use of one or more auxiliary parameters or operations. For example, the auxiliary parameters may process the training image itself, one or more intermediate features of the encoder backbone, and/or the output of the encoder backbone. The output of the auxiliary features may then either be used as the image features, or the output may be combined with the output of the encoder backbone to generate the image features, as discussed above.

At block 315, the machine learning system generates an image embedding (e.g., the embedding 225 of FIG. 2) based on processing the training image using a (potentially pre-trained) image encoder, such as the image encoder 210 of FIG. 2. In some aspects, as discussed above, the image encoder was trained, alongside a text encoder, to generate embeddings that align with the embeddings generated by the text encoder when the image and text inputs semantically align. For example, the image embedding when an image of a cat is processed should align closely with the text embedding when the text "cat" is processed. In some aspects, the image encoder is trained using an encoder-decoder architecture, where an image-to-text model (e.g., a model comprising an encoder that generates image features based on input images, and a decoder that generates text based on image features) is trained alongside a text-to-image model (e.g., a model comprising an encoder that generates text features based on input text, and a decoder that generates images based on text features). By comparing the output of the text-to-image model with an image of the desired object, the text-to-image model may be trained. Similarly, by comparing the output of the image-to-text model with text describing the depicted object(s), the image-to-text model can be trained. After training, the decoders may then be stripped, and the encoder of the image-to-text model can be used as the image encoder. Similarly, the encoder of the text-to-image model can be used as a text encoder, as discussed below.

At block 320, the machine learning system computes a first loss based on the image features (generated at block 310) and the image embedding (generated at block 315). For example, as discussed above, the machine learning system may compute a MAE loss (e.g., the loss component 280A of FIG. 2) between the features and embedding.

At block 325, the machine learning system generates a set of one or more mask embeddings (e.g., the mask embeddings 230 of FIG. 2) based on processing the image features (generated at block 310) using a mask decoder (e.g., the decoder 125 of FIG. 2). In some aspects, as discussed above, the mask decoder may be trained to generate semantic-aware mask embeddings using the method 300. In some aspects, as discussed above, the number of masks to generate may be a configurable hyperparameter, or may be an input to the model.

At block 330, the machine learning system generates one or more text embeddings (e.g., the text embeddings 245 of FIG. 2) using a text encoder (e.g., the text encoder 140 of FIG. 2). In some aspects, the text encoder may be a pre-trained encoder (e.g., trained as part of a CLIP model), as discussed above. In some aspects, the text embeddings correspond to a set of categories (e.g., text categories 235 of FIG. 2) used during training. For example, for each text category, the machine learning system may generate a corresponding text embedding. In some aspects, the machine learning system may generate the set of text embeddings once for the training process (e.g., during the first iteration or round of training), and may thereafter reuse these text embeddings during subsequent rounds (e.g., when processing additional training images).

At block 335, the machine learning system computes a second loss based on the mask embeddings (generated at block 325) and the text embeddings (generated at block 330). For example, in some aspects, the machine learning system computes a dot product (or other similarity metric) between each of the text embeddings and each of the mask embeddings to generate predictions or classifications (e.g., predictions 265). In some aspects, the machine learning system then compares these predictions with ground-truth classifications for the mask(s). For example, as discussed above, the machine learning system may compute a CE loss (e.g., the loss component 280B of FIG. 2) between the correct classifications and the predictions.

At block 340, the machine learning system generates a set of masks based on the mask embeddings. For example, in some aspects, the machine learning system may multiply each of the mask embeddings (generated at block 325) with the image embedding (generated at block 310) to generate a corresponding mask (e.g., the mask 260 of FIG. 2). In some aspects, as discussed above, each mask indicates a set of pixels (from the input training image) that correspond to a single object depicted in the image. That is, each mask may correspond to a different object (or a different segmentation of the same object), indicating pixels that correspond to the respective object.

At block 345, the machine learning system computes a third loss based on the masks. For example, as discussed above, the machine learning system may compute a binary CE between each mask (generated at block 340) and a corresponding set of ground truth masks (e.g., mask ground truths 275 of FIG. 2).

At block 350, the machine learning system updates one or more parameters of one or more components of the machine learning model based on at least one of the first loss, the second loss, and/or the third loss. For example, in some aspects, as discussed above, the first loss may be used to update one or more auxiliary parameters that are used, along with the encoder backbone, to generate the image features. As another example, in some aspects, the second and third losses may be used to update the parameters of the mask decoder. In some aspects, the second and third losses may further be used to update the encoder's auxiliary parameters (if any).

Generally, the particular operations used to update the parameters may vary depending on the particular implementation and architecture. For example, in some aspects, the losses may be backpropagated through the components, generating a gradient for each parameter and then updating each parameter based on the generated gradients.

Although the illustrated example depicts updating the model based on a single training exemplar (e.g., using stochastic gradient descent) for conceptual clarity, in some aspects, the machine learning system may process multiple exemplars and update the model based on a batch of exemplars (e.g., using batch gradient descent).

At block 355, the machine learning system determines whether one or more training termination criteria are met. The particular termination criteria used may vary depending on the particular implementation. For example, in some aspects, the machine learning system may determine whether at least one additional training exemplar remains to be processed, whether a defined amount of time and/or resources have been spent training the model, whether the model has reached a desired accuracy, whether a defined number of iterations or epochs have been performed, and the like. If training is not complete, the method 300 returns to block 305.

If at, block 355, the machine learning system determines that the termination criteria are met, the method 300 continues to block 360. At block 360, the machine learning system deploys the model (e.g., the encoder backbone, any auxiliary parameters, and the mask decoder) for inferencing. In some aspects, deploying the model may generally include any operations used to provide or prepare the model for runtime use. For example, the machine learning system may package the model components in a single data structure, transmit or otherwise provide the learned parameters to another system that performs inferencing, store the model parameters in memory to provide local inferencing by the machine learning system, and the like.

Figure 4:
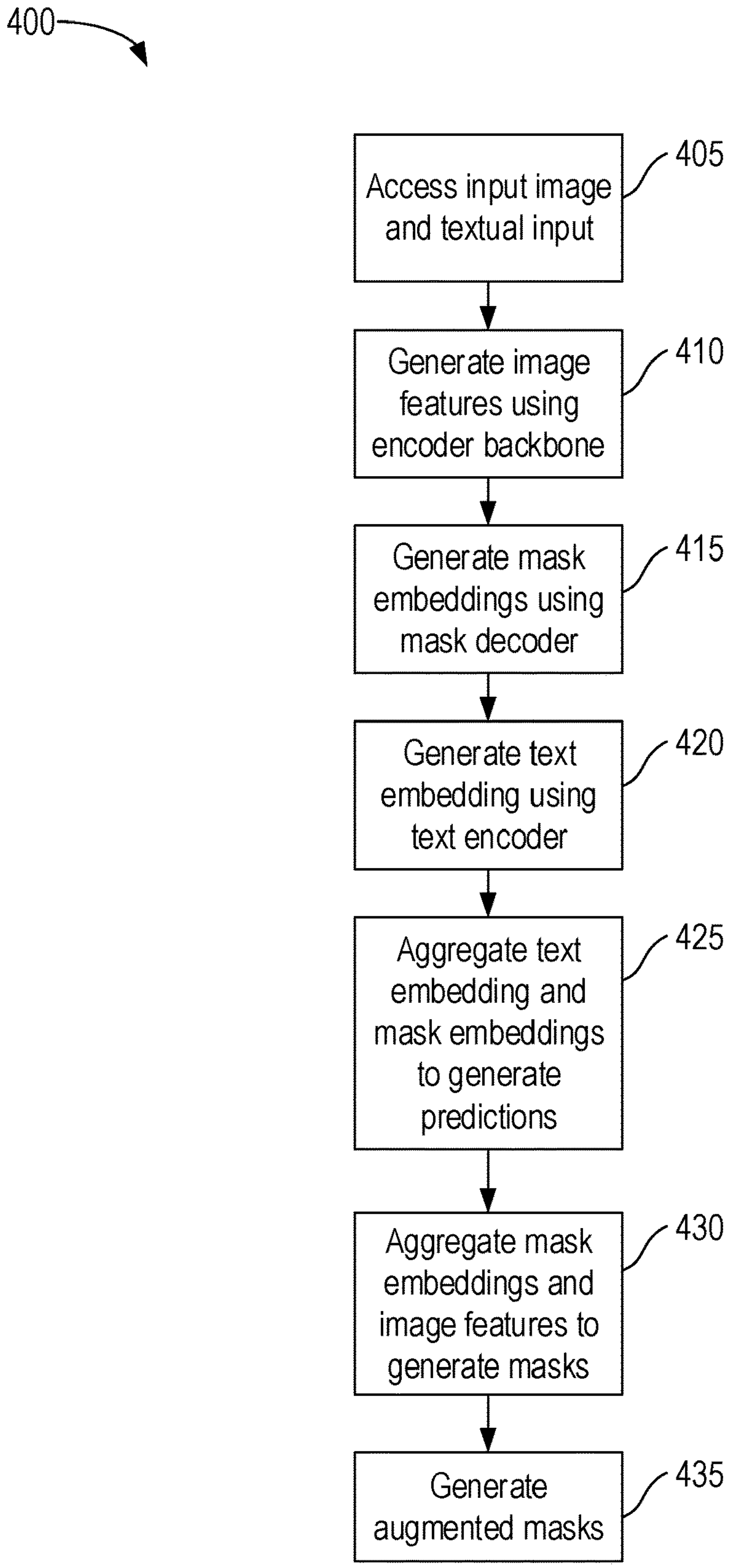
FIG. 4 is a flow diagram depicting an example method for performing panoptic segmentation using machine learning models, according to some aspects of the present disclosure.

Example Method for Performing Panoptic Segmentation Using Machine Learning Models FIG. 4 is a flow diagram depicting an example method 400 for performing panoptic segmentation using machine learning models, according to some aspects of the present disclosure. In some aspects, the method 400 is performed by a machine learning system (e.g., a processing system that uses trained machine learning models to generate augmented masks based on input images and text). In some aspects, the method 400 is performed by the same machine learning system discussed above with reference to FIGS. 1-3. That is, a single processing system may both train the models, as well as use trained models to generate masks. In other aspects, the training operations and prediction operations may be performed on discrete systems.

At block 405, the machine learning system accesses an input image (e.g., the image 110 of FIG. 1) and textual input (e.g., the input text 135 of FIG. 1) as input to a panoptic segmentation machine learning model. As discussed above, the machine learning system may generally access the input from any source, including from a user, from another system or application, and the like. In some aspects, as discussed above, the textual input generally indicates which object(s) the machine learning system should segment out of the image (e.g., which objects should have a mask generated). This may include full natural language sentences (e.g., "please segment out the dogs in this image") or individual words, terms, or phrases (e.g., "the cats" or "segment cat").

At block 410, the machine learning system generates a set of image features (e.g., features 120 of FIG. 1) based on processing the image using an encoder backbone (e.g., the encoder backbone 115 of FIG. 1) of the machine learning model. In some aspects, as discussed above, generating the image features may include use of one or more auxiliary parameters or operations. For example, the auxiliary parameters may process the input image itself, one or more intermediate features of the encoder backbone, and/or the output of the encoder backbone. The output of the auxiliary features may then either be used as the image features, or the output may be combined with the output of the encoder backbone to generate the image features, as discussed above.

At block 415, the machine learning system generates a set of one or more mask embeddings (e.g., the mask embeddings 130 of FIG. 1) based on processing the image features (generated at block 410) using a mask decoder (e.g., the mask decoder 125 of FIG. 1). In some aspects, as discussed above, the mask decoder may be trained to generate semantic-aware mask embeddings. In some aspects, as discussed above, the number of masks to generate may be a configurable hyperparameter, or may be an input to the model.

At block 420, the machine learning system generates one or more text embeddings (e.g., the text embedding 145 of FIG. 1) using a text encoder (e.g., the text encoder 140 of FIG. 1). In some aspects, as discussed above, the text encoder may be a pre-trained encoder (e.g., trained as part of a CLIP model). In some aspects, the text embedding is generated by processing all or a portion of the textual input using the text encoder. For example, in some aspects, the machine learning system may parse the textual input to identify the salient or desired object(s), and process the text corresponding to these object(s) using the text encoder.

At block 425, the machine learning system aggregates the text embedding(s) and the mask embeddings to generate a set of predictions (e.g., the predictions 165 of FIG. 1). For example, as discussed above, the machine learning system may compute a dot product between each text embedding and each mask embedding to generate a probability that the mask embedding depicts or corresponds to the text used to generate the text embedding.

At block 430, the machine learning system generates a set of masks (e.g., the masks 160 of FIG. 1) based on the mask embeddings. For example, in some aspects, the machine learning system may multiply each of the mask embeddings (generated at block 415) with the image embedding (generated at block 410) to generate a corresponding mask. In some aspects, as discussed above, each mask indicates a set of pixels (from the input training image) that correspond to a single object depicted in the image. That is, each mask may correspond to a different object (or a different segmentation of the same object), indicating pixels that correspond to the respective object. However, the masks may lack semantic labels.

At block 435, the machine learning system generates augmented masks based on the predictions (generated at block 425) and the masks (generated at block 430). For example, the machine learning system may link, tag, or otherwise associate each given mask with one or more of the corresponding predictions (predictions that were generated based on the mask embedding that was used to generate the given mask). In some aspects, the machine learning system attaches only the highest-scored prediction (e.g., indicating which category or classification has the highest prediction for the given mask). In some aspects, the machine learning system may generate or output only augmented masks that align with the textual input. For example, for any masks having a prediction greater than some defined threshold, the machine learning system may generate an augmented mask (e.g., a binary mask indicating pixels, as well as a semantic label or classification for the set of pixels) and return this augmented mask. In some aspects, other masks (e.g., those with predictions having low values, indicating that the mask likely does not depict the object or entity described in the text) may be discarded.

In some aspects, as discussed above, the augmented mask(s) may be returned to or provided to the requesting entity (e.g., the user that requested the segmentation). In some aspects, the augmented mask(s) may be provided to one or more downstream processes or operations. For example, in some aspects, the augmented mask(s) may be provided to a post-processing operation, as discussed above and in more detail below with reference to FIG. 5.

Example Method for Post-Processing to Improve Panoptic Segmentation

Figure 5:
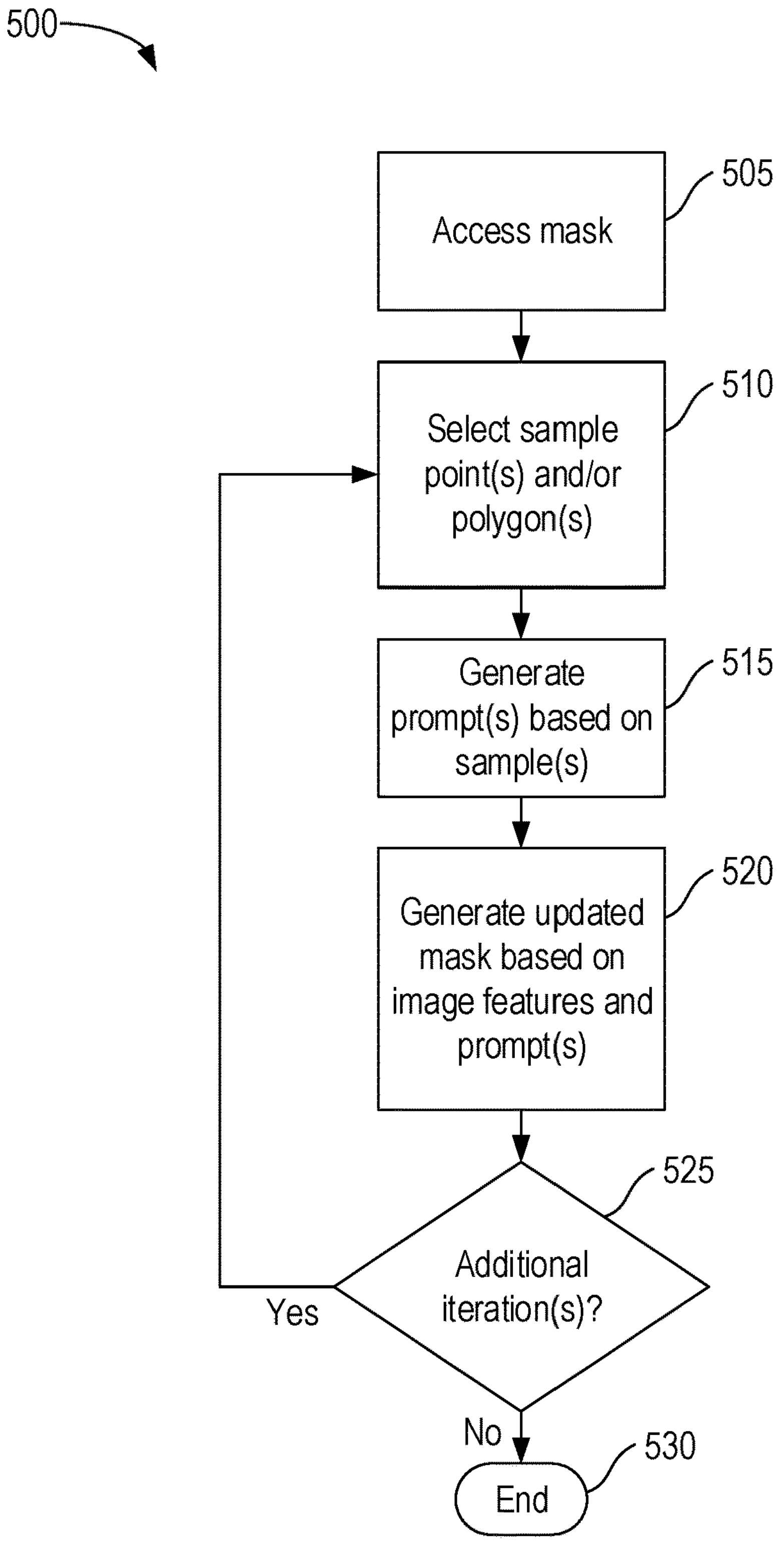
FIG. 5 is a flow diagram depicting an example method for post-processing to improve panoptic segmentation, according to some aspects of the present disclosure.

FIG. 5 is a flow diagram depicting an example method 500 for post-processing to improve panoptic segmentation, according to some aspects of the present disclosure. In some aspects, the method 500 is performed by a machine learning system (e.g., a processing system that uses trained machine learning models to generate augmented masks based on input images and text). In some aspects, the method 500 is performed by the same machine learning system discussed above with reference to FIGS. 1-4. That is, a single processing system may both train the models, as well as use trained models to generate masks. In other aspects, the training operations and prediction operations may be performed on discrete systems.

At block 505, the machine learning system accesses a mask (e.g., the mask 160 of FIG. 1). In some aspects, as discussed above, the mask is an augmented mask. That is, the mask may be associated with a label indicating the mask's semantic classification or meaning. In some aspects, the mask is associated with one or more values or predictions (e.g., indicating the probability that the mask depicts or corresponds to a textual input that was received, along with the input image, to generate the mask). In some aspects, as discussed above, the mask was selected and provided to the post-processing pipeline in response to determining that the mask depicts or corresponds to the input text (e.g., the probability or prediction is above a threshold).

At block 510, the machine learning system selects one or more sample points and/or polygons within the mask. For example, if the mask indicates a set of pixels (from the input image), the machine learning system may select one or more pixels from this set, generate one or more bounding polygons to encircle some (or all) of the pixels, and the like. In some aspects, the points may be sampled using a wide variety of techniques, including randomly or pseudo-randomly. Generally, the number of points (or polygons) to sample may be determined using any suitable criteria. For example, a user may specify how many samples to use, or the machine learning system may randomly determine how many to use.

At block 515, the machine learning system generates one or more prompts based on the selected samples. For example, as discussed above, the machine learning system may, for each sampled point and/or polygon, generate a respective prompt embedding (e.g., the features 190 of FIG. 1) by processing the sampled point/or polygon using a machine learning model or component (e.g., the prompt encoder 185 of FIG. 1).

At block 520, the machine learning system generates an updated mask for each respective prompt based on the image features (e.g., the features 120 of FIG. 1) and the respective prompt. For example, the machine learning system may generate a given updated mask (e.g., updated mask 197 of FIG. 1) by processing the features and the prompt using a decoder model or component, such as the decoder 195 of FIG. 1.

In some aspects, as discussed above, if multiple updated masks are generated (e.g., based on multiple samples), the machine learning system may aggregate the updated masks. For example, the machine learning system may generate a unified updated mask that only includes pixels that were included in at least a defined subset or proportion of the set of updated masks (e.g., in at least half of the updated masks).

At block 525, the machine learning system determines whether to perform one or more mask update iterations. Generally, the machine learning system may evaluate a wide variety of criteria to determine whether to perform an iteration. For example, in some aspects, the machine learning system evaluates the updated mask(s) using one or more objective indicia of quality, such as to evaluate the smoothness of the mask border(s) (e.g., where smoother masks may be considered higher quality, and masks with irregular borders may be considered lower quality). As another example, the machine learning system may determine a variance between the set of updated masks (e.g., how much each differs from the others). As another example, the machine learning system may determine whether the user (or other requesting entity) has requested or indicated that at least one more iterations should be performed.

If another iteration remains or should be performed, the method 500 returns to block 510 to sample new points and/or polygons. In some aspects, this updated sampling is performed with respect to the updated mask(s) that were generated during the prior iteration, in order to continue to refine the mask(s). If no additional iterations remain, the method 500 terminates at block 530. The updated (and augmented) mask(s) can then be returned or output (e.g., to the requesting entity, to a downstream application, and the like).

Figure 6:
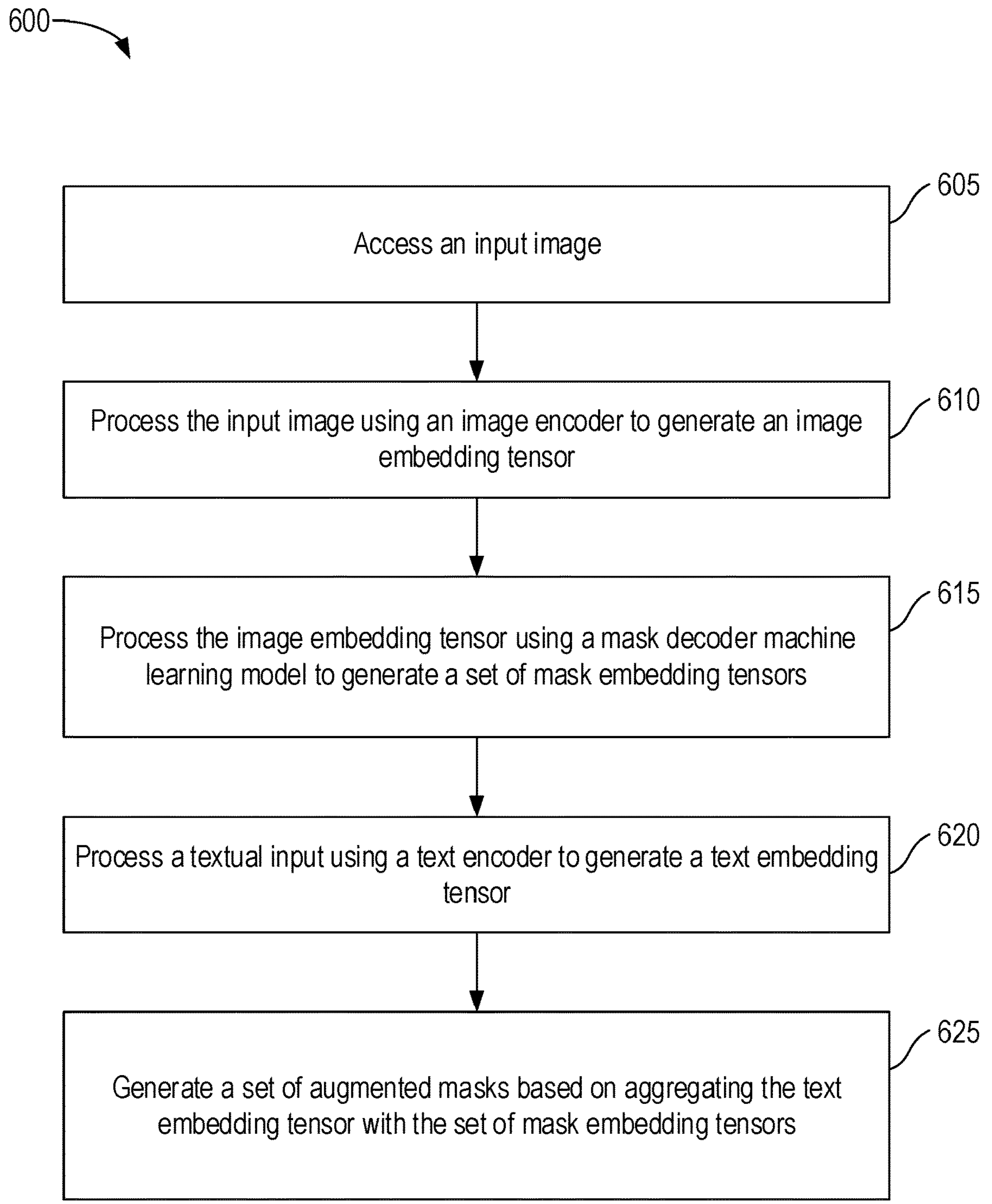
FIG. 6 is a flow diagram depicting an example method for generating augmented mask embeddings using machine learning, according to some aspects of the present disclosure.

Example Method for Generating Augmented Mask Embeddings Using Machine Learning FIG. 6 is a flow diagram depicting an example method 600 for generating augmented mask embeddings using machine learning, according to some aspects of the present disclosure. In some aspects, the method 600 is performed by a machine learning system (e.g., a processing system that uses trained machine learning models to generate augmented masks based on input images and text). In some aspects, the method 600 is performed by the same machine learning system discussed above with reference to FIGS. 1-5. That is, a single processing system may both train the models, as well as use trained models to generate masks. In other aspects, the training operations and prediction operations may be performed on discrete systems.

At block 605, an input image is accessed.

At block 610, the input image is processed using an image encoder to generate an image embedding tensor. In some aspects, the image encoder comprises a first component having parameters that were not trained based on semantic meaning of input images, and one or more auxiliary parameters that were trained based on embeddings generated by a semantic image encoder.

At block 615, the image embedding tensor is processed using a mask decoder machine learning model to generate a set of mask embedding tensors. In some aspects, the mask decoder machine learning model was trained to perform panoptic segmentation based at least in part on a first training image, a set of training mask embedding tensors for the first training image, and a set of category text embedding tensors.

At block 620, a textual input is processed using a text encoder to generate a text embedding tensor.

At block 625, a set of augmented masks is generated based on aggregating the text embedding tensor with the set of mask embedding tensors.

In some aspects, generating the set of augmented masks comprises generating a set of masks based on the set of mask embedding tensors and the image embedding tensor. In some aspects, generating the set of augmented masks comprises generating a set of predictions based on aggregating the text embedding tensor with the set of mask embedding tensors. In some aspects, generating the set of augmented masks comprises associating the set of predictions with the set of masks.

In some aspects, the method 600 further includes generating, based on a first augmented mask of the set of augmented masks, a classification indicating that a region of the image corresponding to the first augmented mask depicts an entity corresponding to the textual input.

In some aspects, the mask decoder machine learning model was trained based at least in part on a set of category text embedding tensors. In such aspects, the set of category text embedding tensors may not include the text embedding.

In some aspects, the method 600 further includes sampling a first set of points within a first mask corresponding to a first augmented mask of the set of augmented masks and generating a first updated mask based on processing the image embedding tensor and the first set of points using a second decoder.

In some aspects, the method 600 further includes sampling a second set of points within the first updated mask and generating a second updated mask based on processing the image embedding tensor and the second set of points using the second decoder.

In some aspects, aggregating the text embedding tensor with the set of mask embedding tensors comprises computing a dot product between the text embedding tensor and the set of mask embedding tensors.

Example Processing System for Machine Learning

Figure 7:
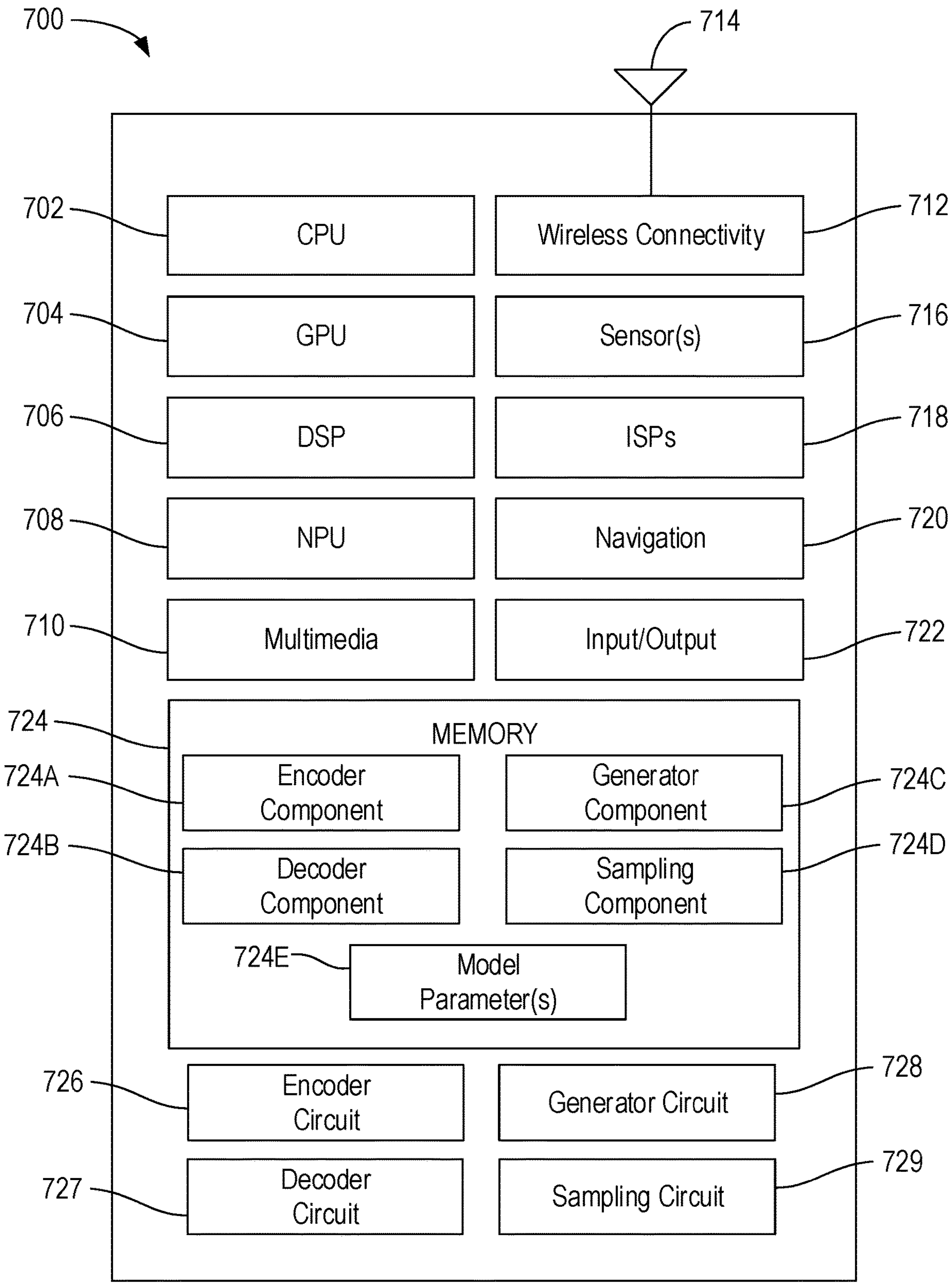
FIG. 7 depicts an example processing system configured to perform various aspects of the present disclosure.

FIG. 7 depicts an example processing system 700 configured to perform various aspects of the present disclosure, including, for example, the techniques and methods described with respect to FIGS. 1-6. In some aspects, the processing system 700 may correspond to a training system. For example, the processing system 700 may correspond to a device trains machine learning models, quantizes machine learning models, trains compensation machine learning models, adapts compensation machine learning models, and/or uses compensated and/or adapted machine learning models for inferencing. Although depicted as a single system for conceptual clarity, in some aspects, as discussed above, the operations described below with respect to the processing system 700 may be distributed across any number of devices or systems.

The processing system 700 includes a central processing unit (CPU) 702, which in some examples may be a multi-core CPU. Instructions executed at the CPU 702 may be loaded, for example, from a program memory associated with the CPU 702 or may be loaded from a memory partition (e.g., a partition of a memory 724).

The processing system 700 also includes additional processing components tailored to specific functions, such as a graphics processing unit (GPU) 704, a digital signal processor (DSP) 706, a neural processing unit (NPU) 708, a multimedia component 710 (e.g., a multimedia processing unit), and a wireless connectivity component 712.

An NPU, such as the NPU 708, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 708, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 708 is a part of one or more of the CPU 702, the GPU 704, and/or the DSP 706.

In some examples, the wireless connectivity component 712 may include subcomponents, for example, for third generation (3G) connectivity, fourth generation (4G) connectivity (e.g., Long-Term Evolution (LTE)), fifth generation (5G) connectivity (e.g., New Radio (NR)), Wi-Fi connectivity, Bluetooth connectivity, and other wireless data transmission standards. The wireless connectivity component 712 is further coupled to one or more antennas 714.

The processing system 700 may also include one or more sensor processing units 716 associated with any manner of sensor, one or more image signal processors (ISPs) 718 associated with any manner of image sensor, and/or a navigation processor 720, which may include satellite-based positioning system components (e.g., GPS or GLONASS) as well as inertial positioning system components.

The processing system 700 may also include one or more input and/or output devices 722, such as screens, touch-sensitive surfaces (including touch-sensitive displays), physical buttons, speakers, microphones, and the like.

In some examples, one or more of the processors of the processing system 700 may be based on an ARM or RISC-V instruction set.

The processing system 700 also includes a memory 724, which is representative of one or more static and/or dynamic memories, such as a dynamic random access memory, a flash-based static memory, and the like. In this example, the memory 724 includes computer-executable components, which may be executed by one or more of the aforementioned processors of the processing system 700.

In particular, in this example, the memory 724 includes an encoder component 724A, a decoder component 724B, a generator component 724C, and a sampling component 724D. Although not depicted in the illustrated example, the memory 724 may also include other components, such as a training component to manage the training machine learning models, as discussed above. Though depicted as discrete components for conceptual clarity in FIG. 7, the illustrated components (and others not depicted) may be collectively or individually implemented in various aspects.

As illustrated, the memory 724 also includes a set of model parameters 724E (e.g., parameters of one or more machine learning models or components thereof. For example, the model parameters 724E may include parameters for components such as the encoder backbone 115 of FIGS. 1-2, the mask decoder 125 of FIGS. 1-2, the text encoder 140 of FIGS. 1-2, the prompt encoder 185 of FIG. 1, the decoder 195 of FIG. 1, and/or the image encoder 210 of FIG. 2. Although not depicted in the illustrated example, the memory 724 may also include other data such as training data (such as the training image 205, the classification(s) 270, and/or the mask ground truth(s) 275, each of FIG. 2).

The processing system 700 further comprises an encoder circuit 726, a decoder circuit 727, a generator circuit 728, and a sampling circuit 729. The depicted circuits, and others not depicted (such as an inferencing circuit), may be configured to perform various aspects of the techniques described herein.

The encoder component 724A and/or the encoder circuit 726 (which may correspond to the encoder backbone 115 of FIGS. 1-2, the text encoder 140 of FIGS. 1-2, the prompt encoder 185 of FIG. 1, and/or the image encoder 210 of FIG. 2) may be used to generate features or embeddings based on input data, as discussed above. For example, the encoder component 724A and/or the encoder circuit 726 may generate features (such as the features 120 of FIG. 1 and/or the features 220 of FIG. 2) based on input images (e.g., the image 110 of FIG. 1 and/or the training image 205 of FIG. 2). As another example, the encoder component 724A and/or the encoder circuit 726 may generate embeddings (such as the text embeddings 145 of FIG. 1 and/or the text embeddings 245 of FIG. 2) based on input text (e.g., the input text 135 of FIG. 1 and/or the text categories 235 of FIG. 2). As yet another example, the encoder component 724A and/or the encoder circuit 726 may generate features (such as the features 190 of FIG. 2) based on sampled points or polygons (e.g., the points 180 of FIG. 1). As yet another example, the encoder component 724A and/or the encoder circuit 726 may generate embeddings (such as the embedding 225 of FIG. 2) based on input images (e.g., the training image 205 of FIG. 2).

The decoder component 724B and/or the decoder circuit 727 (which may correspond to the mask decoder 125 of FIGS. 1-2, and/or the decoder 195 of FIG. 1) may be used to decode input features and embeddings to generate output, as discussed above. For example, the decoder component 724B and/or the decoder circuit 727 may generate mask embeddings (such as the mask embeddings 130 of FIG. 1 and/or the mask embeddings 230 of FIG. 2) based on input features (e.g., the features 120 of FIG. 1 and/or the features 220 of FIG. 2). As another example, the decoder component 724B and/or the decoder circuit 727 may generate updated masks (such as the updated masks 197 of FIG. 1) based on input features (e.g., the features 120 and/or the features 190, each of FIG. 1).

The generator component 724C and/or the generator circuit 728 (which may correspond to the mask generator 155 of FIGS. 1-2) may be used to generate masks based on mask embeddings, as discussed above. For example, the generator component 724C and/or the generator circuit 728 may multiple image features (e.g., the features 120 of FIG. 1 and/or the features 220 of FIG. 2) with mask embeddings (e.g., the mask embeddings 130 of FIG. 1 and/or the mask embeddings 230 of FIG. 2) to generate the masks (e.g., the masks 160 of FIG. 1 and/or the masks 260 of FIG. 2).

The sampling component 724D and/or the sampling circuit 729 (which may correspond to the sampling component 175 of FIG. 1) may be used to sample points and/or polygons from masks, as discussed above. For example, the sampling component 724D and/or the sampling circuit 729 may randomly sample points (e.g., the points 180 of FIG. 1) from input masks in order to facilitate or perform post-processing.

Though depicted as separate components and circuits for clarity in FIG. 7, the encoder circuit 726, the decoder circuit 727, the generator circuit 728, and the sampling circuit 729 may collectively or individually be implemented in other processing devices of the processing system 700, such as within the CPU 702, the GPU 704, the DSP 706, the NPU 708, and the like.

Generally, the processing system 700 and/or components thereof may be configured to perform the methods described herein.

Notably, in other aspects, aspects of the processing system 700 may be omitted, such as where the processing system 700 is a server computer or the like. For example, the multimedia component 710, the wireless connectivity component 712, the sensor processing units 716, the ISPs 718, and/or the navigation processor 720 may be omitted in other aspects. Further, aspects of the processing system 700 maybe distributed between multiple devices.

Example Clauses

Implementation examples are described in the following numbered clauses:

Clause 1: A method, comprising: accessing an input image; processing the input image using an image encoder to generate an image embedding tensor; processing the image embedding tensor using a mask decoder machine learning model to generate a set of mask embedding tensors; processing a textual input using a text encoder to generate a text embedding tensor; and generating a set of augmented masks based on aggregating the text embedding tensor with the set of mask embedding tensors.

Clause 2: A method according to Clause 1, wherein generating the set of augmented masks comprises: generating a set of masks based on the set of mask embedding tensors and the image embedding tensor; generating a set of predictions based on aggregating the text embedding tensor with the set of mask embedding tensors; and associating the set of predictions with the set of masks.

Clause 3: A method according to Clause 2, further comprising generating, based on a first augmented mask of the set of augmented masks, a classification indicating that a region of the image corresponding to the first augmented mask depicts an entity corresponding to the textual input.

Clause 4: A method according to Clause 3, wherein: the mask decoder machine learning model was trained based at least in part on a set of category text embedding tensors, and the set of category text embedding tensors does not include the text embedding.

Clause 5: A method according to any of Clauses 1-4, further comprising: sampling a first set of points within a first mask corresponding to a first augmented mask of the set of augmented masks; and generating a first updated mask based on processing the image embedding tensor and the first set of points using a second decoder.

Clause 6: A method according to Clause 5, further comprising: sampling a second set of points within the first updated mask; and generating a second updated mask based on processing the image embedding tensor and the second set of points using the second decoder.

Clause 7: A method according to any of Clauses 1-6, wherein aggregating the text embedding tensor with the set of mask embedding tensors comprises computing a dot product between the text embedding tensor and the set of mask embedding tensors.

Clause 8: A method according to any of Clauses 1-7, wherein the mask decoder machine learning model was trained to perform panoptic segmentation based at least in part on: a first training image, a set of training mask embedding tensors for the first training image, and a set of category text embedding tensors.

Clause 9: A method according to any of Clauses 1-8, wherein the image encoder comprises: a first component having parameters that were not trained based on semantic meaning of input images; and one or more auxiliary parameters that were trained based on embeddings generated by a semantic image encoder.

Clause 10: A processing system comprising: a memory comprising computer-executable instructions; and one or more processors configured to execute the computer-executable instructions and cause the processing system to perform a method in accordance with any of Clauses 1-9.

Clause 11: A processing system comprising means for performing a method in accordance with any of Clauses 1-9.

Clause 12: A non-transitory computer-readable medium comprising computer-executable instructions that, when executed by one or more processors of a processing system, cause the processing system to perform a method in accordance with any of Clauses 1-9.

Clause 13: A computer program product embodied on a computer-readable storage medium comprising code for performing a method in accordance with any of Clauses 1-9.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processing system comprising:

one or more memories comprising processor-executable instructions; and one or more processors configured to execute the processor-executable instructions and cause the processing system to:

access an input image;

process the input image using an image encoder to generate an image embedding tensor, wherein the image encoder comprises a frozen non-semantic base encoder and a set of auxiliary parameters trained for semantic understanding;

process the image embedding tensor using a mask decoder machine learning model to generate a set of mask embedding tensors;

generate a set of masks based on applying the set of mask embedding tensors with the image embedding tensor;

process a textual input using a text encoder to generate a text embedding tensor; and generate a set of augmented masks based on the set of masks, wherein, to generate the set of augmented masks, the one or more processors are configured to execute the processor-executable instructions and cause the processing system to aggregate the text embedding tensor with the set of mask embedding tensors.

2. The processing system of claim 1, wherein, to generate the set of augmented masks, the one or more processors are configured to execute the processor-executable instructions and cause the processing system to:

generate a set of predictions based on aggregating the text embedding tensor with the set of mask embedding tensors; and associate the set of predictions with the set of masks.

3. The processing system of claim 2, wherein the one or more processors are configured to further execute the processor-executable instructions and cause the processing system to generate, based on a first augmented mask of the set of augmented masks, a classification indicating that a region of the image corresponding to the first augmented mask depicts an entity corresponding to the textual input.

4. The processing system of claim 3, wherein:

the mask decoder was trained based at least in part on a set of category text embedding tensors, and the set of category text embedding tensors does not include the text embedding.

5. The processing system of claim 1, wherein the one or more processors are configured to further execute the processor-executable instructions and cause the processing system to:

sample a first set of points within a first mask corresponding to a first augmented mask of the set of augmented masks; and generate a first updated mask based on processing the image embedding tensor and the first set of points using a second decoder.

6. The processing system of claim 1, wherein the one or more processors are configured to further execute the processor-executable instructions and cause the processing system to:

sample a plurality of points within a first mask of the set of masks;

generate a plurality of updated masks based on processing the image embedding tensor and the plurality points using a second decoder; and generate a unified updated mask based on aggregating the plurality of updated masks.

7. The processing system of claim 1, wherein, to aggregate the text embedding tensor with the set of mask embedding tensors, the one or more processors are configured to execute the processor-executable instructions and cause the processing system to compute a dot product between the text embedding tensor and the set of mask embedding tensors.

8. The processing system of claim 1, wherein the mask decoder was trained to perform panoptic segmentation based at least in part on:

a training image, a set of training mask embedding tensors for the training image, and a set of category text embedding tensors.

9. The processing system of claim 1, wherein:

the frozen non-semantic base encoder comprises parameters that were not trained based on semantic meaning of input images; and the set of auxiliary parameters were trained based on embeddings generated by a semantic image encoder.

10. A processor-implemented method, comprising:

accessing an input image;

processing the input image using an image encoder to generate an image embedding tensor, wherein the image encoder comprises a frozen non-semantic base encoder and a set of auxiliary parameters trained for semantic understanding;

processing the image embedding tensor using a mask decoder machine learning model to generate a set of mask embedding tensors;

generating a set of masks based on applying the set of mask embedding tensors with the image embedding tensor;

processing a textual input using a text encoder to generate a text embedding tensor; and generating a set of augmented masks based on aggregating the text embedding tensor with the set of mask embedding tensors.

11. The processor-implemented method of claim 10, wherein generating the set of augmented masks comprises:

generating a set of predictions based on aggregating the text embedding tensor with the set of mask embedding tensors; and associating the set of predictions with the set of masks.

12. The processor-implemented method of claim 11, further comprising generating, based on a first augmented mask of the set of augmented masks, a classification indicating that a region of the image corresponding to the first augmented mask depicts an entity corresponding to the textual input.

13. The processor-implemented method of claim 12, wherein:

the mask decoder machine learning model was trained based at least in part on a set of category text embedding tensors, and the set of category text embedding tensors does not include the text embedding.

14. The processor-implemented method of claim 10, further comprising:

sampling a first set of points within a first mask corresponding to a first augmented mask of the set of augmented masks; and generating a first updated mask based on processing the image embedding tensor and the first set of points using a second decoder.

15. The processor-implemented method of claim 10, further comprising:

sampling a plurality of points within a first mask of the set of masks;

generating a plurality of updated masks based on processing the image embedding tensor and the plurality points using a second decoder; and generate a unified updated mask based on aggregating the plurality of updated masks.

16. The processor-implemented method of claim 10, wherein aggregating the text embedding tensor with the set of mask embedding tensors comprises computing a dot product between the text embedding tensor and the set of mask embedding tensors.

17. The processor-implemented method of claim 10, wherein the mask decoder machine learning model was trained to perform panoptic segmentation based at least in part on:

a training image, a set of training mask embedding tensors for the training image, and a set of category text embedding tensors.

18. The processor-implemented method of claim 10, wherein:

the frozen non-semantic base encoder comprises parameters that were not trained based on semantic meaning of input images; and the set of auxiliary parameters were trained based on embeddings generated by a semantic image encoder.

19. One or more non-transitory computer-readable media comprising processor-executable instructions that, when executed by one or more processors of a processing system, cause the processing system to:

access an input image;

process the input image using an image encoder to generate an image embedding tensor, wherein the image encoder comprises a frozen non-semantic base encoder and a set of auxiliary parameters trained for semantic understanding;

process the image embedding tensor using a mask decoder machine learning model to generate a set of mask embedding tensors;

generate a set of masks based on applying the set of mask embedding tensors with the image embedding tensor;

process a textual input using a text encoder to generate a text embedding tensor; and generate a set of augmented masks based on the set of masks, comprising aggregating the text embedding tensor with the set of mask embedding tensors.

20. The non-transitory computer-readable media of claim 19, wherein, to generate the set of augmented masks, the instructions cause the processing system to:

generate a set of predictions based on aggregating the text embedding tensor with the set of mask embedding tensors; and associate the set of predictions with the set of masks.

21. The non-transitory computer-readable media of claim 20, wherein the instructions further cause the processing system to generate, based on a first augmented mask of the set of augmented masks, a classification indicating that a region of the image corresponding to the first augmented mask depicts an entity corresponding to the textual input.

22. The non-transitory computer-readable media of claim 21, wherein:

the mask decoder machine learning model was trained based at least in part on a set of category text embedding tensors, and the set of category text embedding tensors does not include the text embedding.

23. The non-transitory computer-readable media of claim 19, wherein the instructions further cause the processing system to:

sample a first set of points within a first mask corresponding to a first augmented mask of the set of augmented masks; and generate a first updated mask based on processing the image embedding tensor and the first set of points using a second decoder.

24. The non-transitory computer-readable media of claim 19, wherein the instructions further cause the processing system to:

sample plurality of points within a first mask of the set of masks;

generate a plurality of updated masks based on processing the image embedding tensor and the plurality points using a second decoder; and generate a unified updated mask based on aggregating the plurality of updated masks.

25. The non-transitory computer-readable media of claim 19, wherein, to aggregate the text embedding tensor with the set of mask embedding tensors, the instructions cause the processing system to compute a dot product between the text embedding tensor and the set of mask embedding tensors.

26. The non-transitory computer-readable media of claim 19, wherein the mask decoder machine learning model was trained to perform panoptic segmentation based at least in part on:

a training image, a set of training mask embedding tensors for the training image, and a set of category text embedding tensors.

27. The non-transitory computer-readable media of claim 19, wherein:

the frozen non-semantic base encoder comprises parameters that were not trained based on semantic meaning of input images; and the set of auxiliary parameters were trained based on embeddings generated by a semantic image encoder.

28. A processing system, comprising:

means for accessing an input image;

means for processing the input image using an image encoder to generate an image embedding tensor, wherein the image encoder comprises a frozen non-semantic base encoder and a set of auxiliary parameters trained for semantic understanding;

means for processing the image embedding tensor using a mask decoder machine learning model to generate a set of mask embedding tensors;

means for generating a set of masks based on applying the set of mask embedding tensors with the image embedding tensor;

means for processing a textual input using a text encoder to generate a text embedding tensor; and means for generating a set of augmented masks based on the set of masks, comprising means for aggregating the text embedding tensor with the set of mask embedding tensors.

29. The processing system of claim 28, wherein the means for generating the set of augmented masks comprise:

means for generating a set of predictions based on aggregating the text embedding tensor with the set of mask embedding tensors; and means for associating the set of predictions with the set of masks.

30. The processing system of claim 28, further comprising:

means for sampling a set of points within a first mask corresponding to an augmented mask of the set of augmented masks; and means for generating an updated mask based on processing the image embedding tensor and the set of points using a second decoder.

* * * * *